United States Patent
Ikai et al.

(10) Patent No.: US 11,530,154 B2
(45) Date of Patent: Dec. 20, 2022

(54) METHOD FOR PRODUCING GLASS FILM

(71) Applicant: Nippon Electric Glass Co., Ltd., Shiga (JP)

(72) Inventors: Naohiro Ikai, Shiga (JP); Kenichi Murata, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 133 days.

(21) Appl. No.: 16/638,883

(22) PCT Filed: Aug. 20, 2018

(86) PCT No.: PCT/JP2018/030686
§ 371 (c)(1),
(2) Date: Feb. 13, 2020

(87) PCT Pub. No.: WO2019/049646
PCT Pub. Date: Mar. 14, 2019

(65) Prior Publication Data
US 2020/0361807 A1 Nov. 19, 2020

(30) Foreign Application Priority Data
Sep. 8, 2017 (JP) .............................. JP2017-172935

(51) Int. Cl.
*C03B 33/03* (2006.01)
*C03B 33/09* (2006.01)
(52) U.S. Cl.
CPC ............ *C03B 33/03* (2013.01); *C03B 33/093* (2013.01)

(58) Field of Classification Search
None
See application file for complete search history.

(56) References Cited

U.S. PATENT DOCUMENTS

| 10,766,804 B2 * | 9/2020 | Mitsugi ................ B23K 26/402 |
| 2012/0318024 A1 | 12/2012 | Mori et al. |

(Continued)

FOREIGN PATENT DOCUMENTS

| JP | 2012-240883 | 12/2012 |
| JP | 2017214241 A * | 12/2017 ............. B23K 26/38 |

(Continued)

OTHER PUBLICATIONS

International Preliminary Report on Patentability and Written Opinion of the International Searching Authority dated Mar. 10, 2020 in International (PCT) Application No. PCT/JP2018/030686.

(Continued)

*Primary Examiner* — Queenie S Dehghan
(74) *Attorney, Agent, or Firm* — Wenderoth, Lind & Ponack, L.L.P.

(57) ABSTRACT

Provided is a method of manufacturing a glass film, including a cleaving step (S5) of cleaving a band-like glass film (G1) conveyed in a predetermined conveying direction (X) through irradiation of the glass film (G1) with a laser beam (L). The cleaving step (S5) includes: a step of, while supporting a lower surface of the glass film (G1) by a surface plate (22) including an opening (25a), suctioning the glass film (G1) through the opening (25a); and a step of irradiating the glass film (G1) suctioned through the opening (25a) with the laser beam (L).

14 Claims, 7 Drawing Sheets

(56) References Cited

U.S. PATENT DOCUMENTS

| | | | |
|---|---|---|---|
| 2015/0191388 A1* | 7/2015 | Abramov | C03B 33/04 65/29.18 |
| 2015/0367444 A1* | 12/2015 | Abramov | B23K 26/359 65/355 |
| 2016/0075589 A1* | 3/2016 | Shi | B65H 23/24 65/25.2 |
| 2019/0161385 A1* | 5/2019 | Mitsugi | C03B 33/0235 |

FOREIGN PATENT DOCUMENTS

| WO | 2012/157639 | 11/2012 |
|---|---|---|
| WO | 2017/208677 | 12/2017 |

OTHER PUBLICATIONS

International Search Report dated Oct. 30, 2018 in International (PCT) Application No. PCT/JP2018/030686.

\* cited by examiner

METHOD FOR PRODUCING GLASS FILM

TECHNICAL FIELD

The present invention relates to a method of manufacturing for example, a band-like glass film.

BACKGROUND ART

As is well known, thinning of glass sheets to be used in flat panel displays (FPD), such as a liquid crystal display and an OLED display, glass sheets to be used in OLED illumination, glass sheets to be used for manufacturing a tempered glass that is a component of a touch panel, and the like, and glass sheets to be used in panels of solar cells, and the like has been promoted in the current circumstances.

For example, in Patent Literature 1, there is disclosed a glass film (thin sheet glass) having a thickness of several hundred micrometers or less. As described also in this literature, this kind of glass film is generally obtained through continuous forming with a forming device employing a so-called overflow down-draw method.

In the method of manufacturing a glass film disclosed in Patent Literature 1, an elongated glass film obtained by the continuous forming by the overflow down-draw method is changed in its conveying direction from a vertical direction to a horizontal direction, and is then continuously conveyed to a downstream side with a lateral conveying unit (horizontal conveying unit) of a conveying device. In the process of the conveyance, both end portions (selvage portions) of the glass film in a width direction are cut and removed. After that, the glass film is taken up into a roll shape with a take-up roller. Thus, a glass roll is formed.

In Patent Literature 1, as a method of cutting both the end portions of the glass film in the width direction, laser cleaving is disclosed. This laser cleaving method involves, while conveying the glass film, forming initial cracks on the glass film by crack forming means, such as a diamond cutter, and then irradiating the portion with a laser beam to heat the portion, followed by cooling the heated portion by cooling means. With this, a thermal stress is generated in the glass film, and the initial cracks are developed through the thermal stress, to thereby cleave the end portions of the glass film in the width direction.

CITATION LIST

Patent Literature 1: JP 2012-240883 A

SUMMARY OF INVENTION

Technical Problem

When an ultra-thin glass film having a thickness of 200 μm or less is cut by the above-mentioned laser cleaving method while conveyed, innumerable wrinkles may occur on the glass film during its conveyance. In the related-art laser cleaving method, when the glass film is cleaved under the state in which the wrinkles overlap with its irradiation position with a laser beam, there is a problem in that a defect remains on an end surface (cross section) of the glass film after the cleavage owing to the wrinkles.

The present invention has been made in view of the above-mentioned circumstances, and a technical object of the present invention is to prevent the occurrence of an end surface defect when a glass film is cut by laser cleaving.

Solution to Problem

In order to solve the above-mentioned problem, according to one embodiment of the present invention, there is provided a method of manufacturing a glass film, comprising a cleaving step of cleaving a band-like glass film conveyed in a predetermined conveying direction through irradiation of the glass film with a laser beam, wherein the cleaving step comprises: a step of, while supporting a lower surface of the glass film by a surface plate comprising an opening, suctioning the glass film through the opening; and a step of irradiating the glass film suctioned through the opening with the laser beam.

With such configuration, part of the band-like glass film conveyed along the conveying direction is suctioned through the opening of the surface plate in the cleaving step, and hence the occurrence of wrinkles on the suctioned part of the glass film can be prevented, or wrinkles having occurred on the glass film can be eliminated. When the suctioned part of the glass film is irradiated with the laser beam, to thereby cleave the glass film, the occurrence of a defect on a cleaved surface (end surface) can be reliably prevented.

In addition, it is desired that the cleaving step comprise a step of conveying the glass film by a conveying device having a predetermined pass line, the surface plate comprise a support portion configured to support the glass film, and an upper surface of the support portion be located above the pass line. When the upper surface of the support portion of the surface plate is located above the pass line as described above, the glass film conveyed by the conveying device is pushed upward by the support portion when passing through the surface plate. With this, the occurrence of wrinkles on the glass film during its passage through the surface plate can be effectively prevented.

In the above-mentioned method, it is desired that the support portion be configured to support the glass film on a downstream side of the opening in the conveying direction, and the cleaving step comprise a cooling step of releasing a cooling medium toward the glass film supported by the support portion on the downstream side of the opening.

The glass film suctioned through the opening is locally heated through irradiation with the laser beam, and is then cooled with the cooling medium at a downstream position. A thermal stress is generated in the glass film owing to expansion caused by the heating with the laser beam and contraction caused by the cooling with the cooling medium. Cracks are developed through the thermal stress, and thus the glass film is cleaved with high accuracy. In this case, the cooling medium is brought into contact with the glass film on the downstream side of the opening. At this position, the support portion is configured to support the glass film so that the glass film is not deformed by the pressure of the cooling medium. With this, the occurrence of an end surface defect owing to the deformation of the glass film can be prevented.

It is desired that the cleaving step comprise a step of adjusting suction power for the glass film through the opening. In the case where the glass film is suctioned through the opening, when the suction power is too high, there is a risk in that the conveyance of the glass film is inhibited. When the suction power through the opening is adjusted in the cleaving step, the glass film can be cleaved while suitably conveyed.

In the cleaving step, it is desired that the glass film have an amplitude of up and down movements of 50 μm or less when passing through the opening. When the amplitude of up and down movements of the glass film is reduced to the extent possible as described above, the occurrence of an end surface defect on the cleaved surface of the glass film can be prevented.

When the glass film is excessively suctioned through the opening, the deformation amount of the glass film is excessively increased, which results in an end surface defect on the cleaved surface of the glass film. In order to prevent such occurrence of the end surface defect, it is desired that the deformation amount of the glass film caused by suction through the opening be 0.3 mm or less.

In the above-mentioned manufacturing method, it is desired that the opening of the surface plate have a constant width, and the width of the opening be 3 mm or more and 30 mm or less. With this, the glass film can be suctioned through the opening with suitable power.

Advantageous Effects of Invention

According to the present invention, the occurrence of an end surface defect when a glass film is cut by laser cleaving can be prevented.

DESCRIPTION OF EMBODIMENTS

Now, embodiments of the present invention are described with reference to the drawings. In each of FIG. 1 to FIG. 9, a method for manufacturing a glass film and a manufacturing apparatus according to embodiments of the present invention are illustrated.

Figure 1:
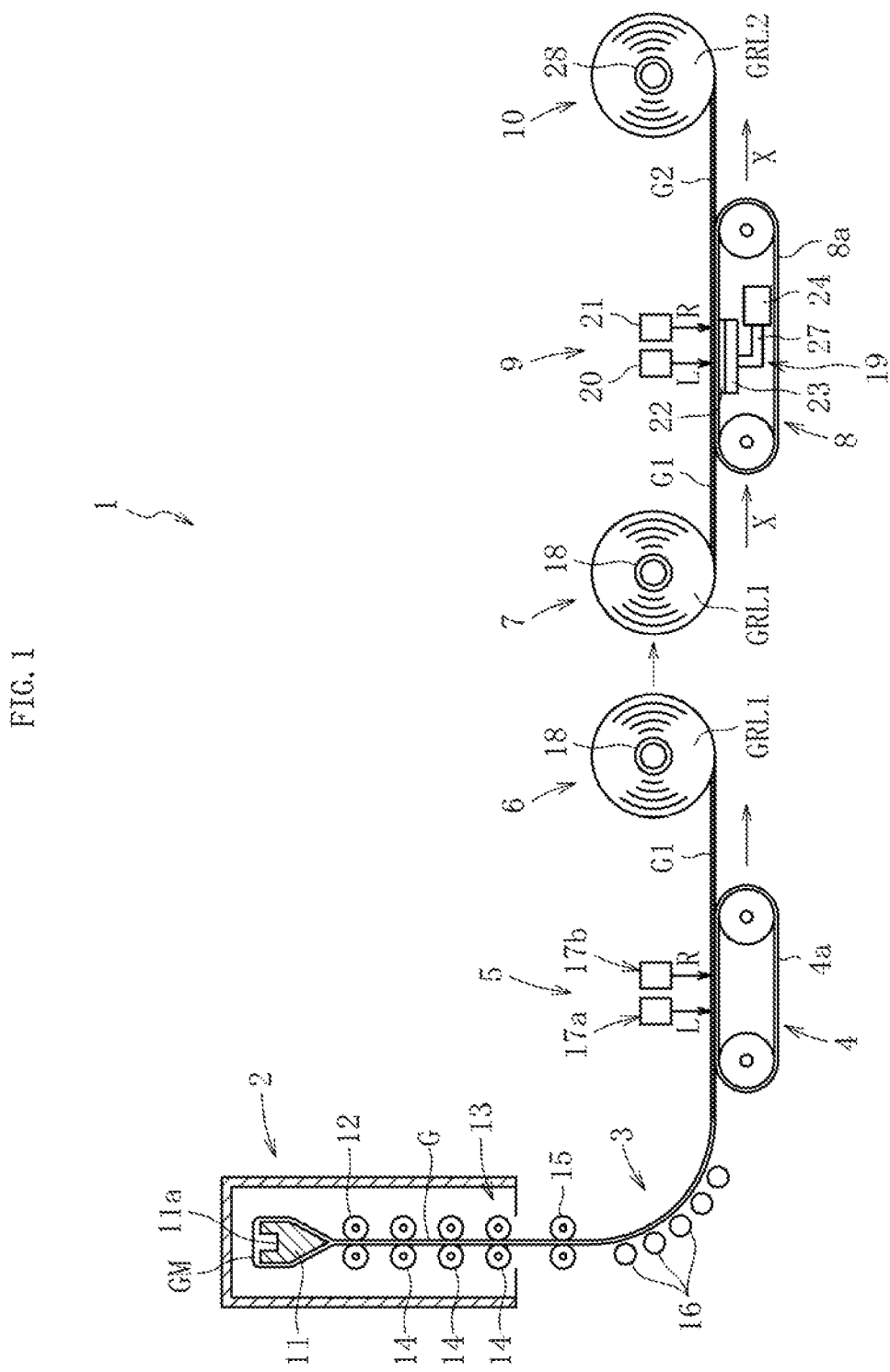
FIG. 1 is aside view for illustrating an apparatus for manufacturing a glass film.

As illustrated in FIG. 1, a manufacturing apparatus 1 comprises: a forming portion 2 configured to form a band-like base glass film G; a direction conversion portion 3 configured to convert a traveling direction of the base glass film G from a vertically downward direction to a lateral direction; a first conveying portion 4 configured to convey the base glass film G in the lateral direction after the direction conversion; a first cutting portion 5 configured to cut end portions (selvage portions) of the base glass film G in a width direction; and a first take-up portion 6 configured to take up a glass film (hereinafter referred to as "first glass film") G1, which is obtained by removing the selvage portions from the base glass film G, into a roll shape to form a first glass roll GRL1.

The manufacturing apparatus 1 further comprises: a take-out portion 7 configured to take the first glass film G1 out of the first glass roll GRL1; a second conveying portion 8 configured to convey the first glass film G1, which has been taken out of the take-out portion 7, in the lateral direction; a second cutting portion 9 configured to cut part of the first glass film G1; and a second take-up portion 10 configured to take up a glass film (hereinafter referred to as "second glass film") G2, which is obtained through the cutting by the second cutting portion 9, into a roll shape to form a second glass roll GRL2.

The forming portion 2 comprises: a forming body 11 having a substantially wedge shape in sectional view in which an overflow groove 11a is formed on an upper end portion thereof; edge rollers 12 arranged immediately below the forming body 11 and configured to sandwich a molten glass GM overflowing from the forming body 11 from both front and back surface sides of the molten glass GM; and an annealer 13 arranged immediately below the edge rollers 12.

The forming portion 2 is configured to cause the molten glass GM overflowing from the overflow groove 11a of the forming body 11 to flow down along both side surfaces of the forming body 11 to be joined at a lower end portion of the forming body 11, to thereby form the molten glass GM into a film shape. The edge rollers 12 are configured to control shrinkage of the molten glass GM in a width direction to form the base glass film G having a predetermined width. The annealer 13 is configured to perform strain removal treatment on the base glass film G. The annealer 13 comprises annealer rollers 14 arranged in a plurality of stages in a vertical direction.

Support rollers 15 configured to sandwich the base glass film G from both the front and back surface sides are arranged below the annealer 13. A tension for encouraging thinning of the base glass film G is applied between the support rollers 15 and the edge rollers 12 or between the support rollers 15 and the annealer rollers 14 at any one position.

The direction conversion portion 3 is arranged at a position below the support rollers 15. In the direction conversion portion 3, a plurality of guide rollers 16 configured to guide the base glass film G are arranged in a curved form. Those guide rollers 16 are configured to guide the base glass film G, which has been conveyed in the vertical direction, in the lateral direction.

The first conveying portion 4 is arranged in a forward traveling direction with respect to (on a downstream side of) the direction conversion portion 3. The first conveying portion 4 is formed of a belt conveyor, but the configuration of the first conveying portion 4 is not limited thereto. A roller conveyor or any other various conveying devices may be used. The first conveying portion 4 is configured to continuously convey the base glass film G having passed through the direction conversion portion 3 to a downstream side by driving an endless band-like belt 4a.

The first cutting portion 5 is arranged above the first conveying portion 4. In this embodiment, the first cutting portion 5 is configured to cut the base glass film G by laser cleaving. The first cutting portion 5 comprises: a pair of laser irradiation devices 17a; and a pair of cooling devices 17b arranged on a downstream side of the laser irradiation devices 17a. The first cutting portion 5 is configured to, while the base glass film G is conveyed, heat a predetermined site of the base glass film G through irradiation with a laser beam L from the laser irradiation device 17a, and then release a cooling medium R from the cooling device 17b to cool the heated site.

The first take-up portion 6 is arranged on a downstream side of the first conveying portion 4 and the first cutting portion 5. The first take-up portion 6 is configured to take up the first glass film G1 into a roll shape by rotating a winding core 18. The first glass roll GRL1 formed as described above is conveyed to the position of the take-out portion 7. The take-out portion 7 is configured to take the first glass film G1 out of the first glass roll GRL1 having been formed by the first take-up portion 6, and supply the first glass film G1 to the second cutting portion 9.

The second conveying portion 8 is configured to convey the first glass film G1, which has been taken out of the first glass roll GRL1 by the take-out portion 7, along a lateral direction (hereinafter referred to as "conveying direction") X. The second conveying portion 8 is formed of a belt conveyor, but the configuration of the second conveying portion 8 is not limited thereto. A roller conveyor or any other various conveying devices may be used. The second conveying portion 8 is configured to convey the first glass film G1 to the second take-up portion 10 on a downstream side by driving a plurality of endless band-like belts 8a.

The vertical positions of the plurality of belts 8a are set so that the first glass film G1 is maintained in a substantially horizontal posture. That is, the plurality of belts 8a are arranged so that contact portions 8b with the first glass film G1 have the same vertical position (height). With this, a pass line PL is formed along a horizontal direction.

The second cutting portion 9 is located in the middle of the second conveying portion 8. The second cutting portion 9 comprises: a suction device 19 configured to suction the first glass film G1; and a pair of laser irradiation devices 20 and a pair of cooling devices 21 arranged above the second conveying portion 8.

The suction device 19 comprises: a pair of surface plates 22 to be brought into contact with a lower surface of the first glass film G1; a support member 23 for the surface plates 22; and a suction pump 24 to be connected to the surface plates 22.

Figure 2:
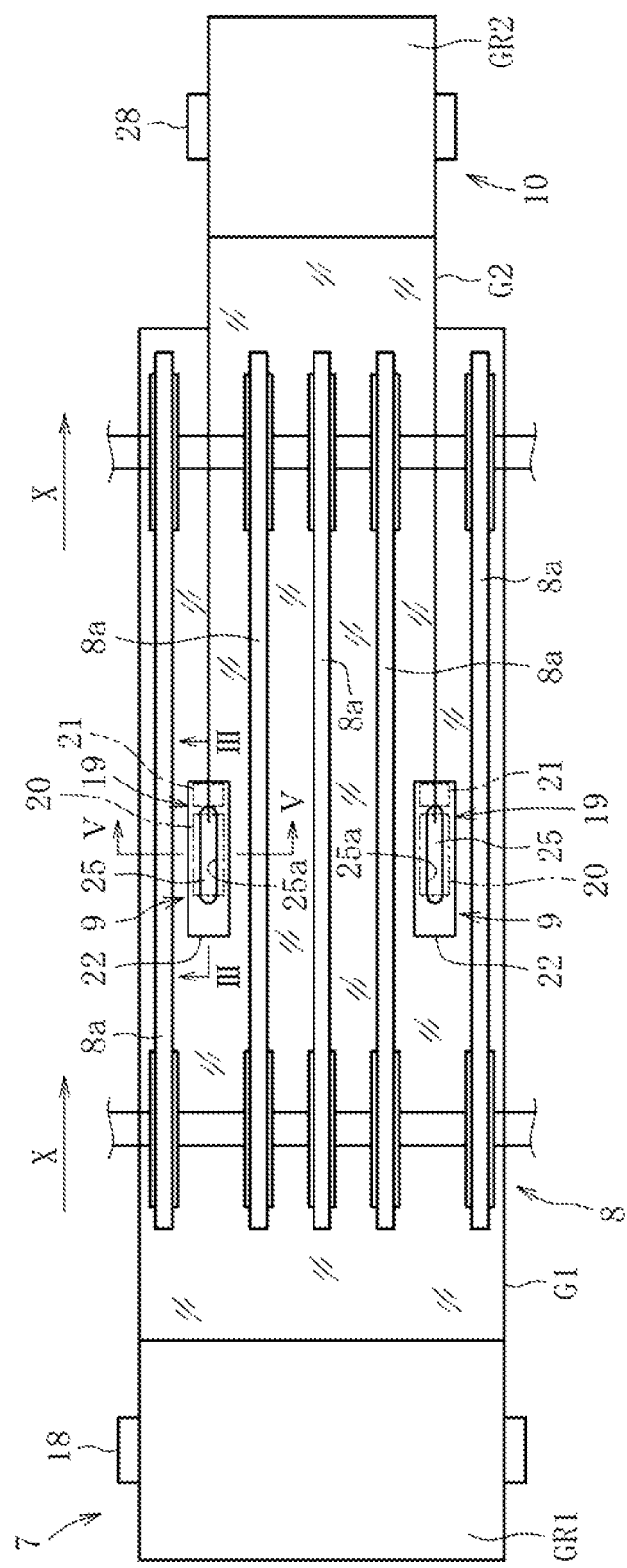
FIG. 2 is a plan view for illustrating part of the apparatus for manufacturing a glass film.
Figure 3:
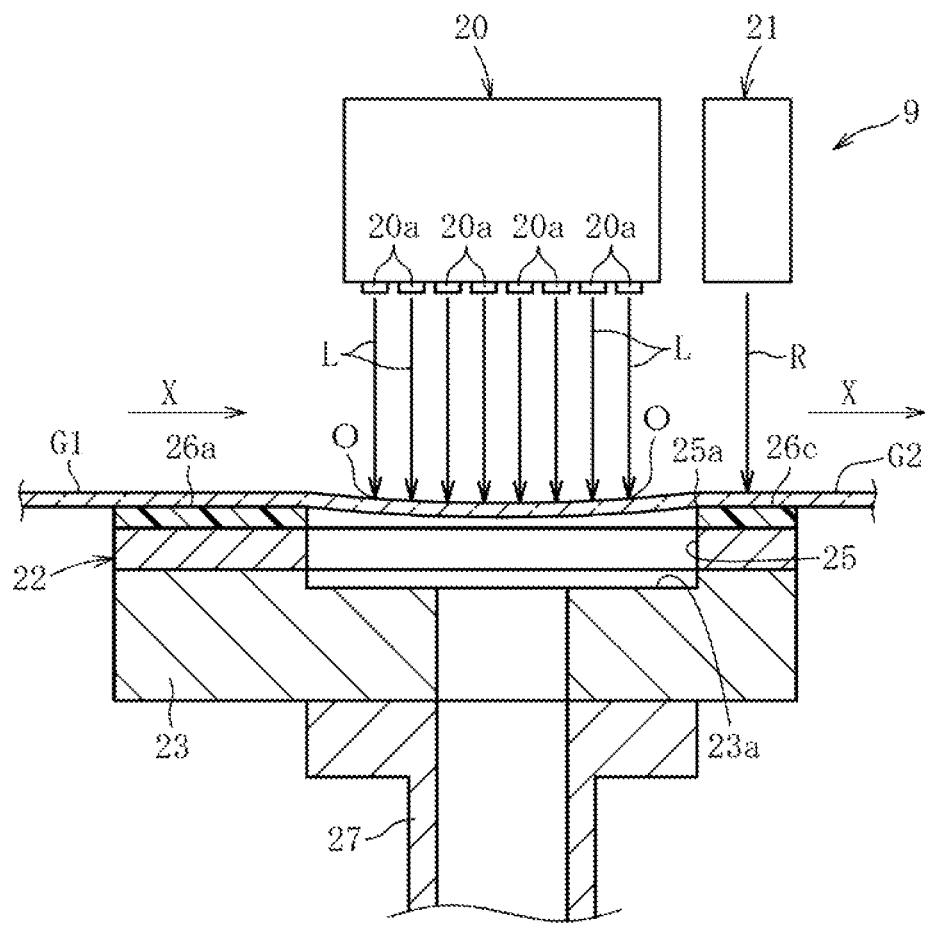
FIG. 3 is a sectional view taken along the line III-III of FIG. 2.

As illustrated in FIG. 2 and FIG. 3, the surface plates 22 are each arranged between the plurality of belts 8a of the second conveying portion 8. The surface plate 22 is formed of a sheet member made of a metal. The surface plate 22 has a rectangular shape having a predetermined length LP and a predetermined width W, but the shape of the surface plate 22 is not limited thereto. The length LP of the surface plate 22 is set to 80 mm or more and 260 mm or less, but is not limited to this range. The width W of the surface plate 22 is set to 30 mm or more and 60 mm or less, but is not limited to this range.

The surface plate 22 comprises: a hole 25 penetrating therethrough in a thickness direction; and support portions 26a to 26c to be brought into contact with the first glass film G1.

Figure 4:
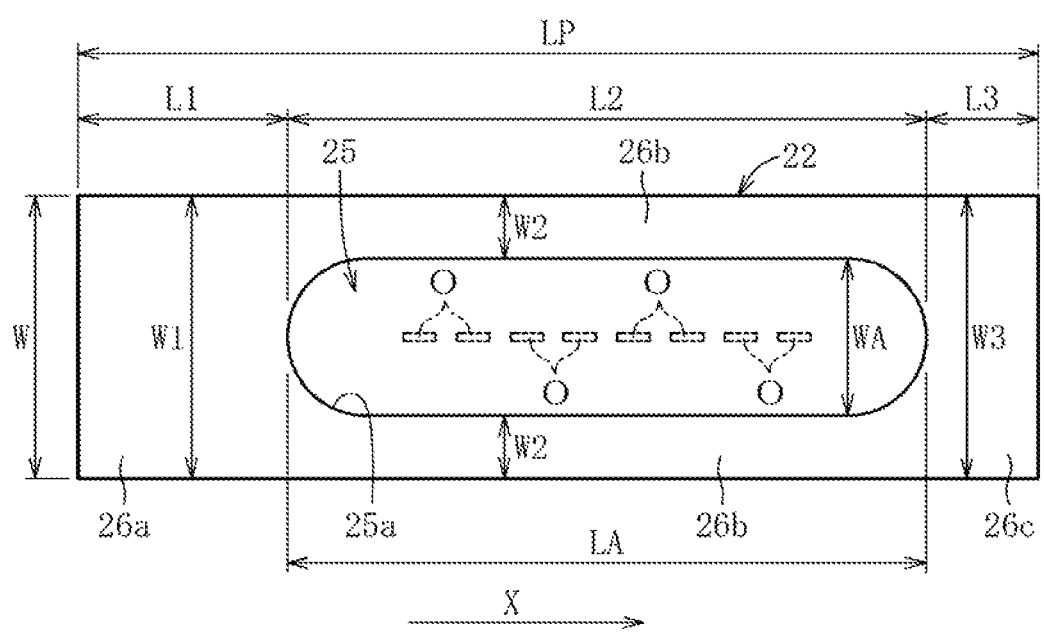
FIG. 4 is a plan view of a surface plate.

As illustrated in FIG. 4, the hole 25 is formed of a linear elongated hole along the conveying direction X of the first glass film G1. The surface plate 22 is configured to suction the lower surface of the first glass film G1 through an opening 25a formed at an upper end of the hole 25. The opening 25a has a predetermined length LA along the conveying direction X of the first glass film G1 and a constant width WA in a direction perpendicular to the conveying direction X. The length LA of the opening 25a is desirably set to 40 mm or more and 80 mm or less. The width WA of the opening 25a is set to preferably 3 mm or more and 30 mm or less, more preferably 3 mm or more and 20 mm or less.

Figure 5:
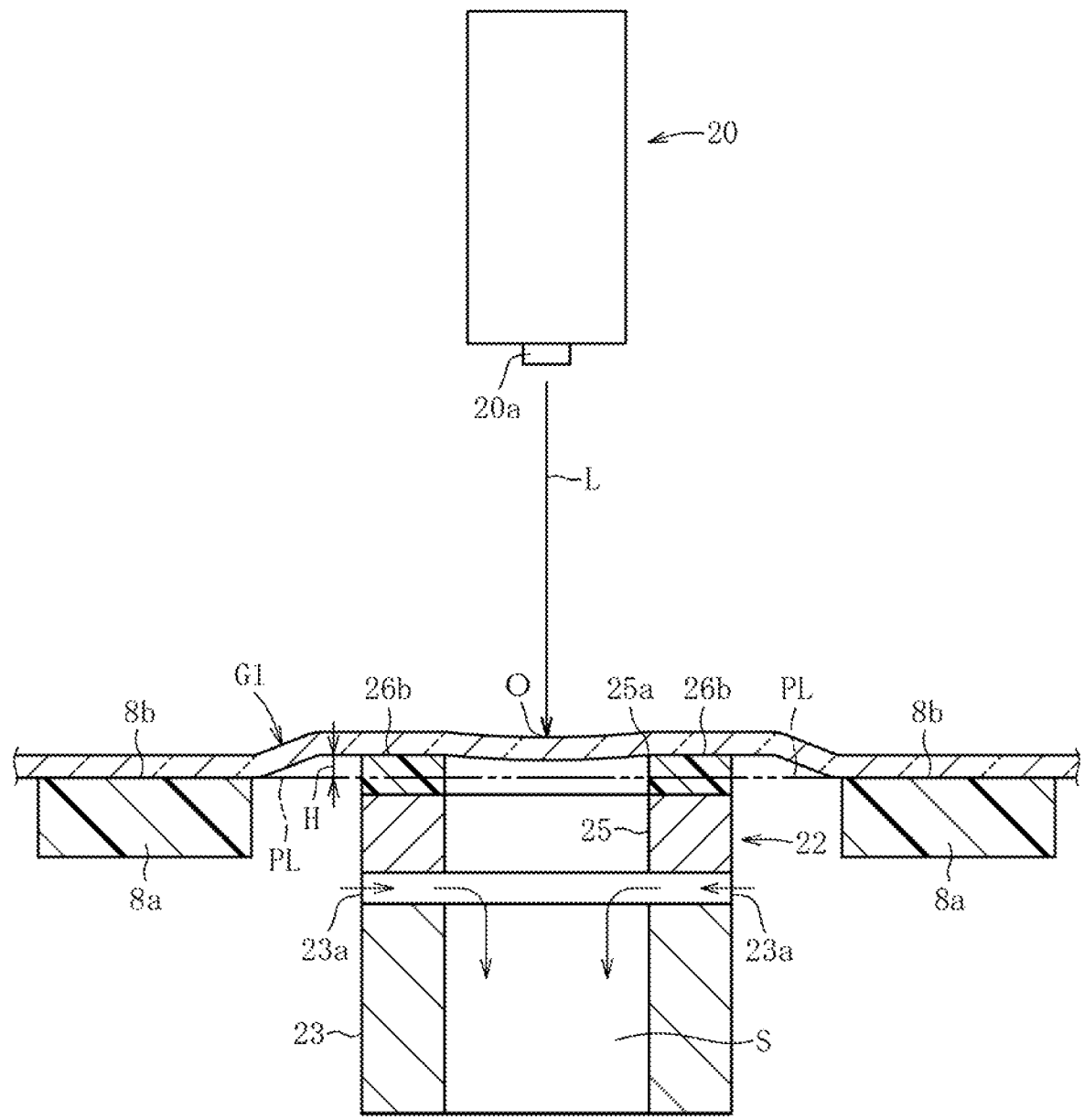
FIG. 5 is a sectional view taken along the line V-V of FIG. 2.

The support portions 26a to 26c are each formed of a sheet member made of a resin, but the materials of the support portions 26a to 26c are not limited thereto. As illustrated in FIG. 5, upper surfaces of the support portions 26a to 26c are each located above the pass line PL of the second conveying portion 8. A difference H in height between each of the upper surfaces of the support portions 26a to 26c and the pass line PL (top of the belt 8a) is set to desirably 0 mm or more and 3.0 mm or less, more desirably 0.5 mm or more and 3.0 mm or less.

The support portions 26a to 26c comprise: a first support portion 26a; a second support portion 26b located on a downstream side of the first support portion 26a; and a third support portion 26c located on a downstream side of the second support portion 26b. The first support portion 26a is arranged in a region of the surface plate 22 ranging from an end portion thereof on an upstream side to the opening 25a. A length L1 of the first support portion 26a is desirably set to 10 mm or more and 50 mm or less. A width W1 of the first support portion 26a is equal to the width W of the surface plate 22.

The second support portion 26b is located outside (on both sides of) the hole 25 of the surface plate 22 in a width direction of the hole 25. A length L2 of the second support portion 26b is equal to the length LA of the hole 25 (opening 25a). A width W2 of the second support portion 26b is set to 1 mm or more and 15 mm or less, but is not limited to this range.

The third support portion 26c is located on a downstream side of the opening 25a. The third support portion 26c is configured to support part of the first glass film G1 to be cooled with the cooling medium R released from the cooling device 21. A length L3 of the third support portion 26c is set to 10 mm or more and 160 mm or less, but is not limited to this range. A width W3 of the third support portion 26c is equal to the width W of the surface plate 22.

The support member 23 is configured to support a bottom portion of the surface plate 22. The support member 23 is, for example, formed of a metal into a block shape. An opening (gap) 23a through which the air outside the support member 23 is suctioned is arranged between the support member 23 and the surface plate 22. The support member 23 comprises an internal space S communicating to the hole 25 of the surface plate 22. Part of the suction device 19 is connected to a bottom portion of the support member 23.

The suction pump 24 is arranged at a position close to the second conveying portion 8. The suction pump 24 is connected to the support member 23 through a connecting pipe 27. With this, the suction pump 24 is configured to suction the air from the opening 23a of the support member 23 and the opening 25a of the surface plate 22 through the connecting pipe 27 and the internal space S of the support member 23.

The laser irradiation devices 20 are each configured to radiate the laser beam L to a predetermined site of the first glass film G1 moving along the conveying direction X, to thereby locally heat the site. As illustrated in FIG. 3, the laser irradiation device 20 comprises a plurality of laser irradiation portions 20a. The laser irradiation portions 20a are arranged above the opening 25a of the surface plate 22. With this, the laser irradiation portions 20a are configured to radiate the laser beams L to a plurality of sites of the first glass film G1 passing through the opening 25a. Irradiation positions O with the laser beams L from the laser irradiation portions 20a are set so as to be positioned on a straight line substantially parallel to the conveying direction X of the first glass film G1.

The cooling devices 21 are arranged on a downstream side of the laser irradiation devices 20 in the conveying direction X of the first glass film G1. The cooling devices 21 are each configured to release the cooling medium R toward the locally heated site of the first glass film G1 to cool the site.

The second take-up portion 10 is arranged on a downstream side of the second conveying portion 8 and the second cutting portion 9. The second take-up portion 10 is configured to take up the second glass film G2, which is conveyed from the second conveying portion 8, around a winding core 28, to thereby form the second glass roll GRL2.

As a material of the second glass film G2 (first glass film G1) to be manufactured by the above-mentioned manufacturing apparatus 1, silicate glass or silica glass is used. Borosilicate glass, soda-lime glass, aluminosilicate glass, or chemically tempered glass is preferably used, and alkali-free glass is most preferably used. The "alkali-free glass" as used herein refers to glass substantially free of an alkaline component (alkali metal oxide), and specifically refers to glass having a weight ratio of an alkaline component of 3,000 ppm or less. In the present invention, the weight ratio of the alkaline component is preferably 1,000 ppm or less, more preferably 500 ppm or less, most preferably 300 ppm or less.

In addition, the thickness of the second glass film G2 (first glass film G1) is set to 10 μm or more and 300 μm or less, and is preferably 30 μm or more and 200 μm or less, most preferably 30 μm or more and 100 μm or less.

Figure 6:
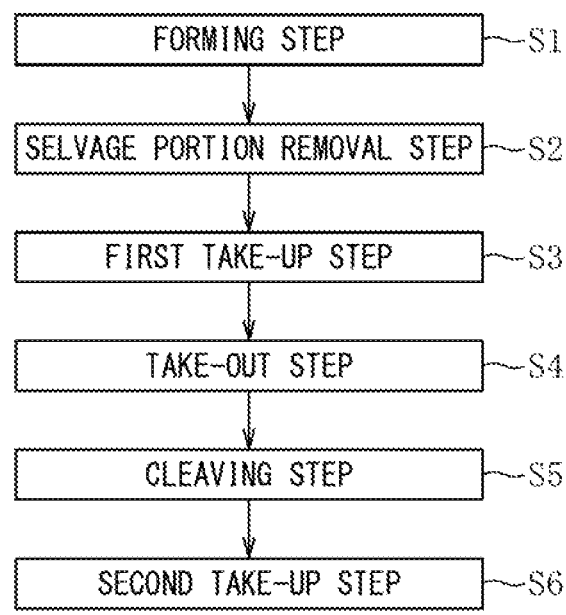
FIG. 6 is a flowchart of a method of manufacturing a glass film.

Now, a method of manufacturing the second glass film G2 (second glass roll GRL2) through use of the manufacturing apparatus 1 having the above-mentioned configuration is described. As illustrated in FIG. 6, this method comprises: a forming step S1; a selvage portion removal step S2; a first take-up step S3; a take-out step S4; a cleaving step S5; and a second take-up step S6.

In the forming step S1, the molten glass GM overflowing from the overflow groove 11a of the forming body 11 in the forming portion 2 is caused to flow down along both side surfaces of the forming body 11 to be joined at a lower end of the forming body 11, to thereby form the molten glass GM into a film shape. At this time, the shrinkage of the molten glass GM in a width direction is controlled with the edge rollers 12, and thus the base glass film G having a predetermined width is formed. After that, strain removal treatment is performed on the base glass film G with the annealer 13 (annealing step). The base glass film G having a predetermined thickness is formed through a tension applied by the support rollers 15.

In the selvage portion removal step S2, while the base glass film G is sent to a downstream side by the direction conversion portion 3 and the first conveying portion 4, part of the base glass film G is heated through irradiation with the laser beam L by the laser irradiation device 17a in the first cutting portion 5. After that, the cooling medium R is jetted to the heated site by the cooling device 17b. With this, a thermal stress is generated in the base glass film G. Initial cracks formed in the base glass film G in advance are developed through the thermal stress. With this, selvage portions are removed from the base glass film G. Thus, the first glass film G1 is formed.

In the subsequent first take-up step S3, the first glass film G1 is taken up around the winding core 18, to thereby form the first glass roll GRL1. After that, the first glass roll GRL1 is transferred to the take-out portion 7. In the take-out step S4, the first glass film G1 is taken out of the first glass roll GRL1 having been transferred to the take-out portion 7, and is conveyed to the second cutting portion 9 by the second conveying portion 8.

Figure 7:
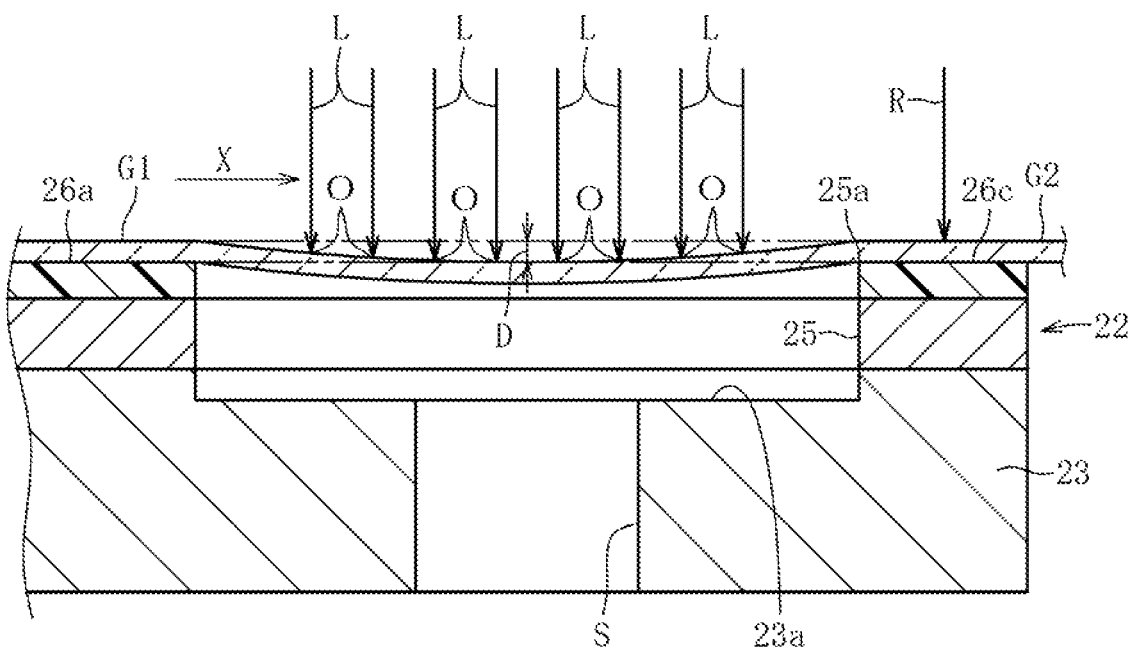
FIG. 7 is a sectional view for illustrating an aspect of a glass film in a cleaving step.
Figure 8:
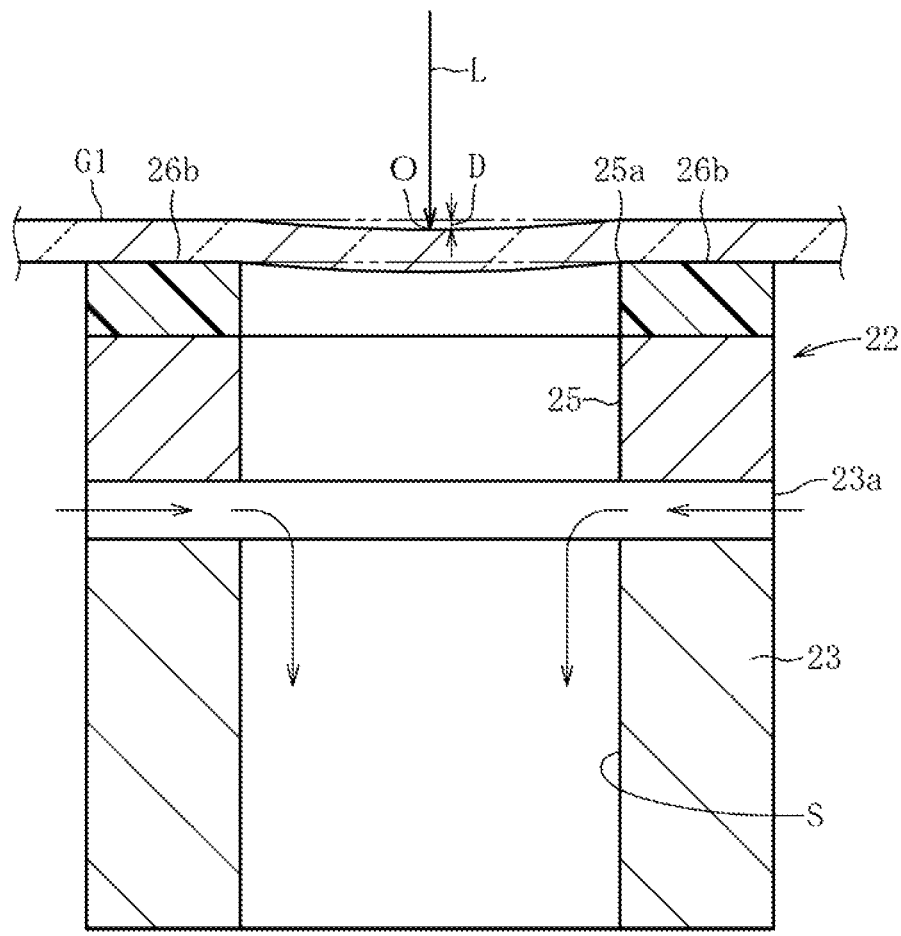
FIG. 8 is a sectional view for illustrating the aspect of the glass film in the cleaving step.

In the cleaving step S5, part of the first glass film G1 is conveyed by the second conveying portion 8 to pass over the support portions 26a to 26c of the surface plate 22 (conveying step). The suction device 19 always activates the suction pump 24, and the first glass film G1 on the surface plate 22 is suctioned through the opening 25a of the surface plate 22 (suction step). As illustrated in FIG. 7 and FIG. 8, the first glass film G1 is deformed into a concave shape in the region of the opening 25a by being suctioned through the opening 25a while being supported by the second support portion 26b of the surface plate 22.

In the cleaving step S5, while the first glass film G1 is moved, the first glass film G1 is suctioned through the opening 25a to be deformed in the region of the opening 25a. In this case, a deformation amount D of the first glass film G1 is desirably set to 0.1 mm or more and 0.3 mm or less. The deformation amount D is an average of values continuously measured every 0.1 second when the first glass film G1 is conveyed by 10 m. The deformation amount D is measured under the state in which the laser beam L is not radiated in order to eliminate the influence of thermal expansion caused by the laser beam L. In the cleaving step S5, the suction power of the suction device 19 is adjusted so that the deformation amount D of the first glass film G1 is reduced to the extent possible. Specifically, the suction power through the opening 25a is adjusted by adjusting an air suction amount by the suction pump 24, and as well, by suctioning the air through the opening 23a formed in the support member 23 (suction power adjusting step). The open area of the opening 23a is adjusted through use of a closing member.

Figure 9:
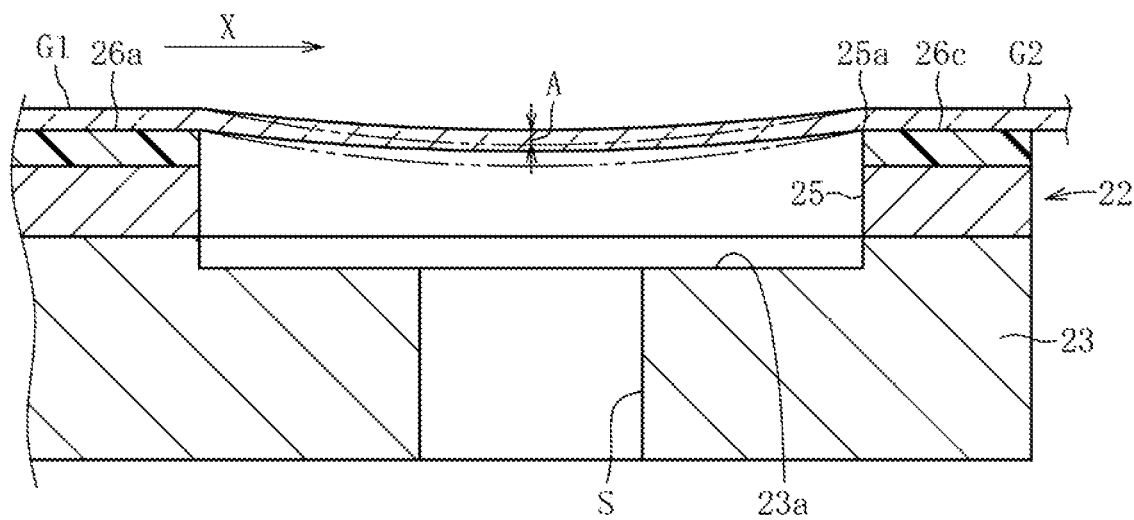
FIG. 9 is a sectional view for illustrating behavior of the glass film in the cleaving step.

When the first glass film G1 is suctioned through the opening 25a while conveyed by the second conveying portion 8, slight up and down movements (oscillation) may be caused therein through the adjustment of the suction power (reduction of the suction power) (see FIG. 9). The range (amplitude) A of up and down movements of the first glass film G1 can be reduced to the extent possible by adjusting the suction power through the opening 25a. Specifically, the range A of up and down movements of the first glass film G1 can be set to 10 μm or more and 50 μm or less. That is, when the first glass film G1 is conveyed by 10 m, out of values for the range A of up and down movements continuously measured every 0.1 second, the minimum value and the maximum value are desirably set to 10 μm or more and 50 μm or less, respectively. The range A of up and down movements is measured with a known laser displacement sensor. The range A of up and down movements is measured under the state in which the laser beam L is not radiated in order to eliminate the influence of thermal expansion caused by the laser beam L.

In the adjustment of the suction power, when a suction amount is increased, there is a tendency that the above-mentioned deformation amount D is increased, but the above-mentioned range A of up and down movements is reduced. In contrast, when the suction amount is reduced, there is a tendency that the above-mentioned deformation amount D is reduced, but the above-mentioned range A of up and down movements is increased. Therefore, it is preferred that the deformation amount D be reduced to the extent possible so that the range A of up and down movements falls within an acceptable range. With regard to the suction power, a wind speed through the opening 25a preferably falls within the range of from 1 m/s to 6 m/s. The wind speed is measured with a known anemometer.

In the cleaving step S5, while the first glass film G1 is conveyed by the second conveying portion 8 as described above, the first glass film G1 is irradiated with a plurality of laser beams L from the laser irradiation portions 20a of the laser irradiation device 20 (laser irradiation step). The laser beams L are radiated to part of the first glass film G1 passing through the region of the opening 25a of the surface plate 22.

Through such irradiation with the laser beams L, the first glass film G1 is heated at the irradiation positions O with the laser beams L. After that, the heated site of the first glass film G1 passes through the opening 25a, and is cooled by the cooling device 21 (cooling step). Specifically, the cooling medium R is jetted downward from the cooling device 21 located above the third support portion 26c of the surface plate 22. A thermal stress is generated in the first glass film G1 owing to expansion caused by the local heating with the laser irradiation device 20 and contraction caused by the cooling with the cooling device 21. Initial cracks formed in the first glass film G1 in advance are developed through the thermal stress. With this, end portions of the first glass film G1 in a width direction are continuously cut. Thus, the second glass film G2 is formed. The second glass film G2 is subsequently conveyed by the second conveying portion 8 to the second take-up portion 10 on a downstream side.

In the second take-up step S6, the second glass film G2 is taken up around the winding core 28. When the second glass film G2 having a predetermined length is taken up, the second glass roll GRL2 (glass product) is formed.

By the method of manufacturing a glass film (second glass film G2) according to this embodiment described above, the first glass film G1 is suctioned through the opening 25a of the surface plate 22 of the suction device 19, and thus the occurrence of wrinkles on the first glass film G1 during its passage through the opening 25a can be prevented. Besides, even when wrinkles occur on the first glass film G1 before the first glass film G1 passes through the surface plate 22, the wrinkles can be eliminated by the suction through the opening 25a. Therefore, when the first glass film G1 passing through the opening 25a is irradiated with the laser beam L, and on a downstream side, is brought into contact with the cooling medium R by the cooling device 21, the first glass film G1 can be cleaved with high accuracy without causing a defect on a cleaved surface of the second glass film G2.

In addition, when the air is suctioned through the opening 23a present at a different position from the opening 25a of the surface plate 22, the suction power for the first glass film G1 through the opening 25a of the surface plate 22 can be adjusted. With this, a conveyance failure of the first glass film G1 caused by strongly suctioning the first glass film G1 through the opening 25a of the surface plate 22 can be prevented.

Figure 10:
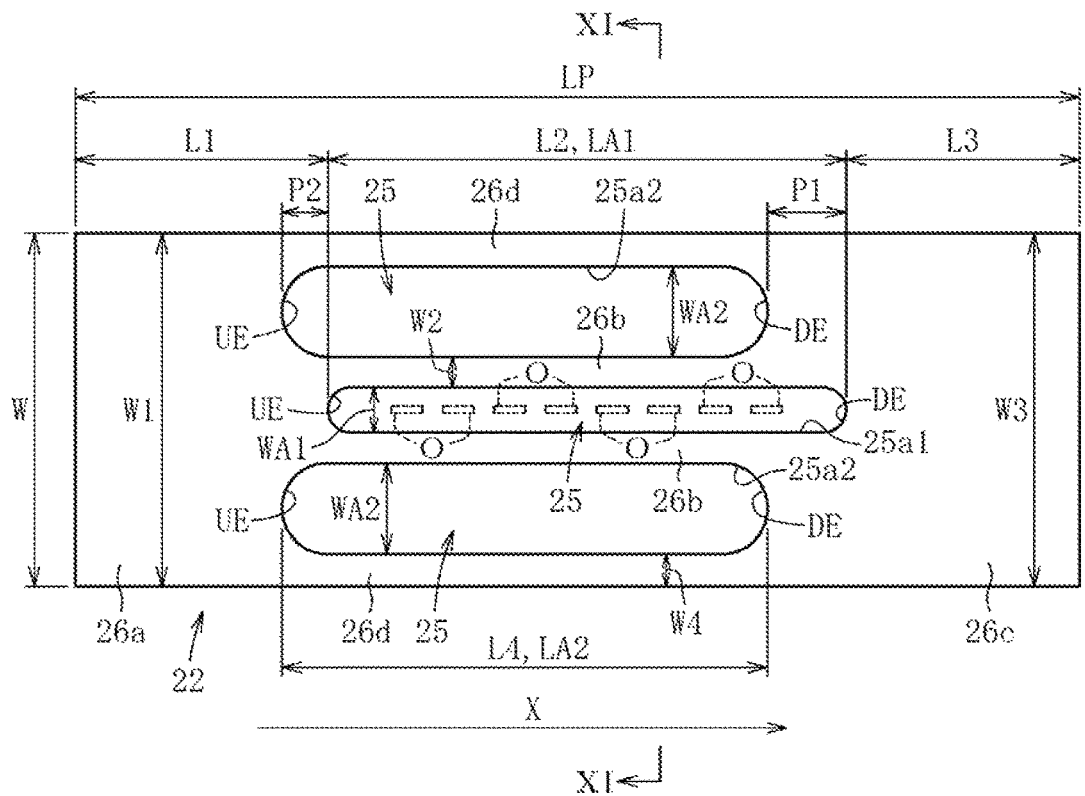
FIG. 10 is a plan view for illustrating another example of a suction device.
Figure 11:
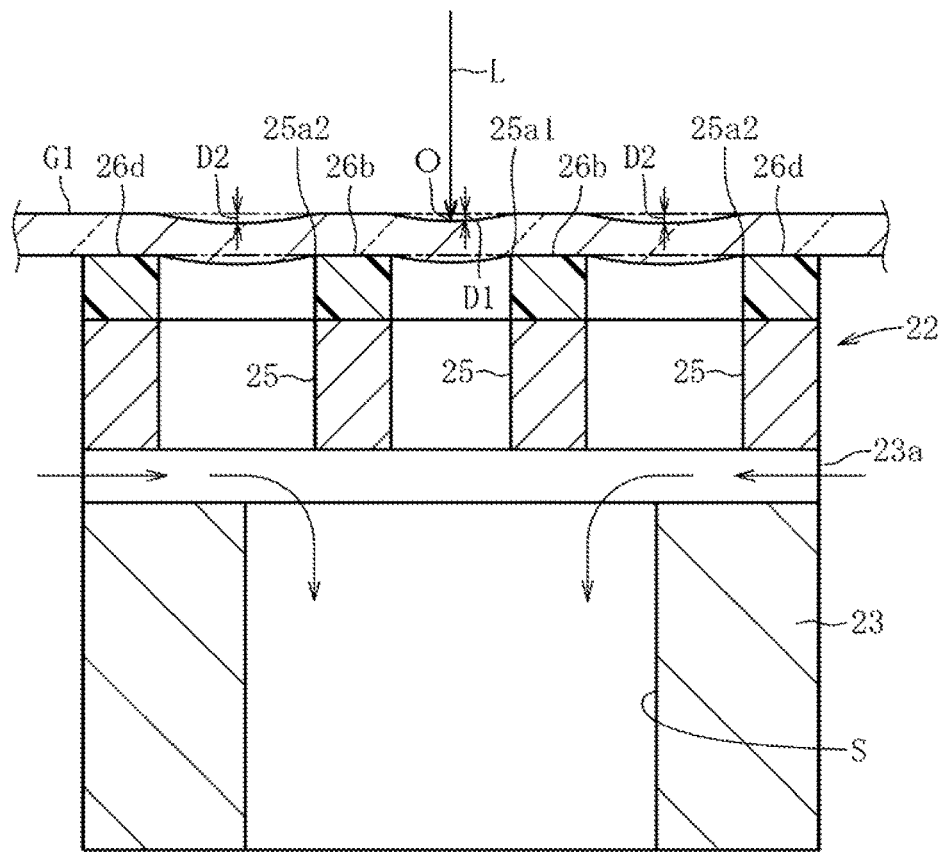
FIG. 11 is a sectional view taken along the line XI-XI of FIG. 10.

Another example of the suction device is illustrated in FIG. 10 and FIG. 11. As illustrated in FIG. 10 and FIG. 11, the surface plate 22 comprises a plurality of holes 25, and the holes 25 comprise: a first opening 25a1 in the region of which the laser beams L are radiated; and a pair of second openings 25a2 each arranged so as to be spaced apart from the first opening 25a1 in a width direction of the surface plate 22.

The first opening 25a1 has the same function as the opening 25a of the surface plate 22 illustrated in FIG. 3 and FIG. 4. The first opening 25a1 is arranged between the pair of second openings 25a2. When the second openings 25a2 are formed on the surface plate 22, a length LA1 of the first opening 25a1 is desirably set to 40 mm or more and 80 mm or less. In addition, a width WA1 of the first opening 25a1 is desirably set to 3 mm or more and 5 mm or less.

An end portion DE of the first opening 25a1 on a downstream side protrudes on a downstream side with respect to the end portions DE of the second openings 25a2 on a downstream side. A protrusion amount P1 of the end portion DE of the first opening 25a1 on a downstream side is desirably set to 5 mm or more and 20 mm or less.

The pair of second openings 25a2 are each formed so as to be longer and wider than the first opening 25a1, but the configurations of the second openings 25a2 are not limited thereto. A length LA2 of each of the second openings 25a2 is desirably set to 40 mm or more and 80 mm or less. In addition, a width WA2 of each of the second openings 25a2 is desirably set to 8 mm or more and 10 mm or less. End portions UE of the second openings 25a2 on an upstream side protrude on an upstream side with respect to the end portion UE of the first opening 25a1 on an upstream side. A protrusion amount P2 of each of the end portions UE of the second openings 25a2 on an upstream side is desirably set to 10 mm or more and 20 mm or less.

The second support portion 26b of the surface plate 22 separates the first opening 25a1 and the second opening 25a2 in the width direction of the surface plate 22. A separate distance between the first opening 25a1 and the second opening 25a2 in the width direction of the surface plate 22, that is, the width W2 of the second support portion 26b is desirably set to 1 mm or more and 3 mm or less.

The surface plate 22 comprises a fourth support portion 26d in addition to the first support portion 26a to the third support portion 26c. The fourth support portion 26d is located outside the second opening 25a2 in a width direction of the second opening 25a2. A length L4 of the fourth support portion 26d is desirably set to 40 mm or more and 80 mm or less. A width W4 of the fourth support portion 26d is desirably set to 3 mm or more and 5 mm or less.

As illustrated in FIG. 11, the first opening 25a1 and the second openings 25a2 communicate to the internal space S of the support member 23. With this, the first opening 25a1 and the second openings 25a2 are configured to suction the lower surface of the first glass film G1 by the same suction pump 24. When the suction amount by the suction pump 24 is reduced, there is a tendency that a deformation amount D1 of the first glass film G1 through the first opening 25a1 is larger than a deformation amount D2 of the first glass film G1 through the second opening 25a2 under the state in which the first glass film G1 is not irradiated with the laser beams L. In contrast, when the suction amount by the suction pump 24 is increased, as illustrated in FIG. 11, there is a tendency that the deformation amount D2 of the first glass film G1 through the second opening 25a2 is larger than the deformation amount D1 of the first glass film G1 through the first opening 25a1 under the state in which the first glass film G1 is not irradiated with the laser beams L. The case in which the deformation amount D2 of the first glass film G1 through the second opening 25a2 is larger than the deformation amount D1 of the first glass film G1 through the first opening 25a1 as illustrated in FIG. 11 is preferred because the stability of the cutting of the first glass film G1 with the laser beam L is increased. When the first glass film G1 is irradiated with the laser beam L, even in the case where the suction amount by the suction pump 24 is increased, there is a tendency that the deformation amount D1 of the first glass film G1 through the first opening 25a1 is larger than the deformation amount D2 of the first glass film G1 through the second opening 25a2 by the influence of heat caused by the laser beam L.

In this example, the first glass film G1 is suctioned through the first opening 25a1 and the second openings 25a2 of the surface plate 22, and thus the occurrence of wrinkles on the first glass film G1 during its passage through the first opening 25a1 can be prevented. Besides, even when wrinkles occur on the first glass film G1 before the first glass film G1 passes through the surface plate 22, the wrinkles can be eliminated by the suction through the first opening 25a1 and the second openings 25a2. In addition, the open area (particularly width WA1) of the first opening 25a1 can be reduced to the extent possible through the arrangement of the second openings 25a2 on the surface plate 22. With this, the deformation amount D and the range A of up and down movements of the first glass film G1 passing through the first opening 25a1 can be reduced, and thus the first glass film G1 can be cleaved with high accuracy.

The present invention is not limited to the configurations of the above-mentioned embodiments. In addition, the action and effect of the present invention are not limited to those described above. The present invention may be modified in various forms within the range not departing from the spirit of the present invention.

While an example in which the base glass film G is formed by an overflow down-draw method is presented in the above-mentioned embodiment, the present invention is not limited thereto. The base glass film G may be formed by any other forming method.

While an example in which the first glass film G1 is cleaved while suctioned by the suction device 19 in the second cutting portion 9 is presented in the above-mentioned embodiment, the present invention is not limited thereto. The base glass film G may be suctioned by a suction device in the first cutting portion 5. The suction device 19 is arranged in one or both of the first cutting portion 5 and the second cutting portion 9.

REFERENCE SIGNS LIST 22 surface plate
23 support member
25a opening
25a1 first opening
26a first support portion
26b second support portion
26c third support portion
G1 first glass film
L laser beam
X conveying direction

The invention claimed is:

1. A method of manufacturing a glass film, the method comprising a cleaving step of cleaving a band-like glass film conveyed in a predetermined conveying direction through irradiation of the glass film with a laser beam,
wherein the cleaving step comprises:
a step of, while supporting a lower surface of the glass film by a surface plate comprising an opening, suctioning the glass film through the opening;
a step of irradiating the glass film suctioned through the opening with the laser beam; and
a step of conveying the glass film by a conveying device having a predetermined pass line,
wherein the conveying device comprises:
a first belt that comes into contact with the glass film; and
a second belt that comes into contact with the glass film,
wherein the first belt and the second belt are arranged so that a contact portion of the first belt with the glass film and a contact portion of the second belt with the glass film have a same vertical height,
wherein the surface plate is arranged between the first belt and the second belt,
wherein the pass line is set to a height of positions at which the glass film comes into contact with the first belt and the second belt,
wherein the surface plate comprises a support portion configured to support the glass film,
wherein the support portion comprises an upper surface that comes into contact with the lower surface of the glass film,
wherein the upper surface of the support portion is located above the position where the contact portion of the first belt comes into contact with the glass film, and
wherein the upper surface of the support portion is located above the position where the contact portion of the second belt comes into contact with the glass film.

2. The method of manufacturing a glass film according to claim 1,
wherein the support portion is configured to support the glass film on a downstream side of the opening in the conveying direction, and
wherein the cleaving step further comprises a cooling step of releasing a cooling medium toward the glass film supported by the support portion on the downstream side of the opening.

3. The method of manufacturing a glass film according to claim 2, wherein the cleaving step further comprises a step of adjusting suction power for the glass film through the opening.

4. The method of manufacturing a glass film according to claim 3, wherein, in the cleaving step, the glass film has an amplitude of up and down movements of 10 μm or more and 50 μm or less when passing the opening.

5. The method of manufacturing a glass film according to claim 3, wherein a deformation amount of the glass film caused by suction through the opening is 0.1 mm or more and 0.3 mm or less.

6. The method of manufacturing a glass film according to claim 2, wherein, in the cleaving step, the glass film has an amplitude of up and down movements of 10 μm or more and 50 μm or less when passing the opening.

7. The method of manufacturing a glass film according to claim 2, wherein a deformation amount of the glass film caused by suction through the opening is 0.1 mm or more and 0.3 mm or less.

8. The method of manufacturing a glass film according to claim 1, wherein the cleaving step further comprises a step of adjusting suction power for the glass film through the opening.

9. The method of manufacturing a glass film according to claim 8, wherein, in the cleaving step, the glass film has an amplitude of up and down movements of 10 μm or more and 50 μm or less when passing the opening.

10. The method of manufacturing a glass film according to claim 8, wherein a deformation amount of the glass film caused by suction through the opening is 0.1 mm or more and 0.3 mm or less.

11. The method of manufacturing a glass film according to claim 1, wherein, in the cleaving step, the glass film has an amplitude of up and down movements of 10 μm or more and 50 μm or less when passing the opening.

12. The method of manufacturing a glass film according to claim 11, wherein a deformation amount of the glass film caused by suction through the opening is 0.1 mm or more and 0.3 mm or less.

13. The method of manufacturing a glass film according to claim 1, wherein a deformation amount of the glass film caused by suction through the opening is 0.1 mm or more and 0.3 mm or less.

14. The method of manufacturing a glass film according to claim 1,
   wherein the opening of the surface plate has a constant width, and
   wherein the width of the opening is 3 mm or more and 30 mm or less.

\* \* \* \* \*